May 19, 1959  J. M. MERGEN ET AL  2,887,200
SERVO-OPERATED CLUTCHES

Filed Aug. 26, 1955  4 Sheets-Sheet 1

INVENTORS
JOSEPH M. MERGEN and
HOWARD MURPHY

BY  Godfrey B. Speir

ATTORNEY

May 19, 1959  J. M. MERGEN ET AL  2,887,200
SERVO-OPERATED CLUTCHES

Filed Aug. 26, 1955  4 Sheets-Sheet 2

INVENTORS
JOSEPH M. MERGEN and
HOWARD MURPHY

BY Godfrey B. Spier
ATTORNEY

May 19, 1959 — J. M. MERGEN ET AL — 2,887,200
SERVO-OPERATED CLUTCHES
Filed Aug. 26, 1955 — 4 Sheets-Sheet 3

INVENTORS
JOSEPH M. MERGEN and
HOWARD MURPHY
BY
Godfrey B. Speir
ATTORNEY

May 19, 1959     J. M. MERGEN ET AL     2,887,200
SERVO-OPERATED CLUTCHES
Filed Aug. 26, 1955     4 Sheets-Sheet 4
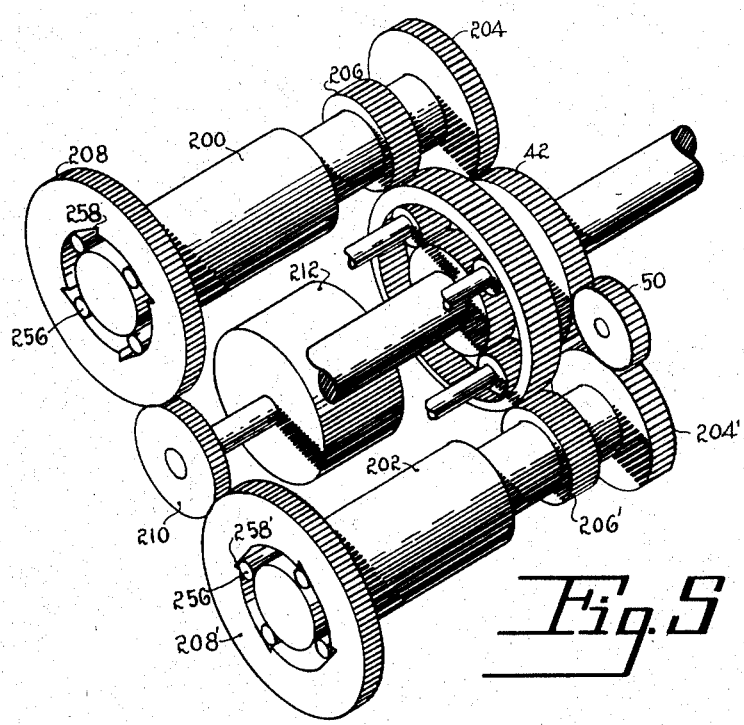
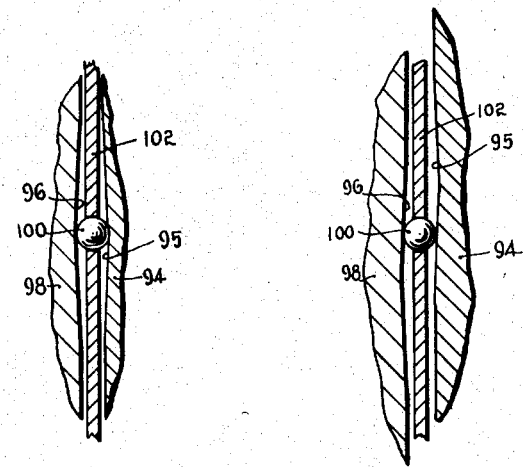
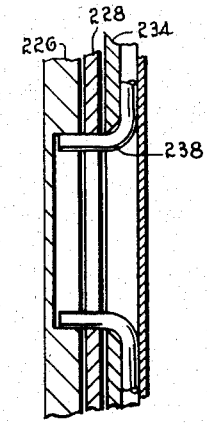
INVENTORS
JOSEPH M. MERGEN and
HOWARD MURPHY
BY
Godfrey D. Speir
ATTORNEY United States Patent Office 2,887,200
Patented May 19, 1959

2,887,200

SERVO-OPERATED CLUTCHES

Joseph M. Mergen, Verona, N.J., and Howard Murphy, Glendora, Calif., assignors to Curtiss-Wright Corporation, a corporation of Delaware Original application February 11, 1950, Serial No. 143,636, now Patent No. 2,738,045, dated March 13, 1956. Divided and this application August 26, 1955, Serial No. 530,787

1 Claim. (Cl. 192—35)

This invention relates to servo-operated mechanical clutches. It is a division of application Serial Number 143,636 filed February 11, 1950, now Patent Number 2,738,045 granted March 13, 1956. Further, the invention relates to pitch-changing mechanisms of the type in which power for pitch change is derived principally from the power plant driving the propeller, pitch-changing power being obtained by the clutching of the driving member to gearing connected with the propeller blades. Clutch mechanisms are provided for increasing pitch and for decreasing pitch; a brake is provided to hold fixed pitch; and control mechanism is provided to energize the clutches electrically, intermittently if desired, in accordance with demands for pitch change at different rates.

The present invention includes novel types of electrically actuated clutches and brakes to connect and disconnect the prime mover relative to the propeller pitch change mechanism. These clutches comprise servo mechanisms whereby relatively small amounts of electrical energy may be utilized for control purposes to actuate clutches having high torque capacity.

The nature of the invention may be appreciated in detail by reading the annexed detailed description in connection with the drawings in which:

Fig. 5 is a perspective elevation of part of the pitch change drive gearing as utilized in the system of Fig. 4 incorporating the clutch and brake units of Fig. 2;

Fig. 6 is a typical section on the line 6—6 of Fig. 2;

Fig. 7 is a section similar to Fig. 6 showing the mechanism adjusted to a different position; and Fig. 8 is a typical section on the line 8—8 of Fig. 2 showing the arrangement of one form of a centering or disengaging spring for a clutch unit.

Figure 1:
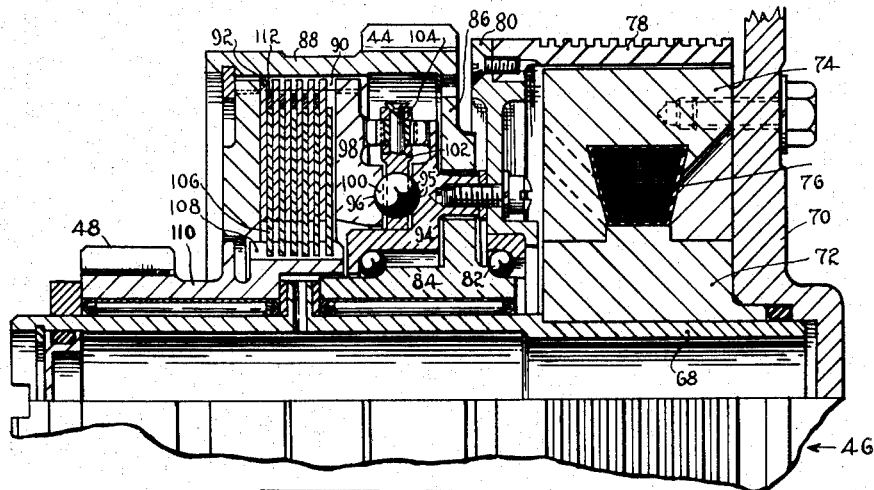
Fig. 1 is a longitudinal section through one of the eddy current operated clutch units of the invention.
Figure 3:
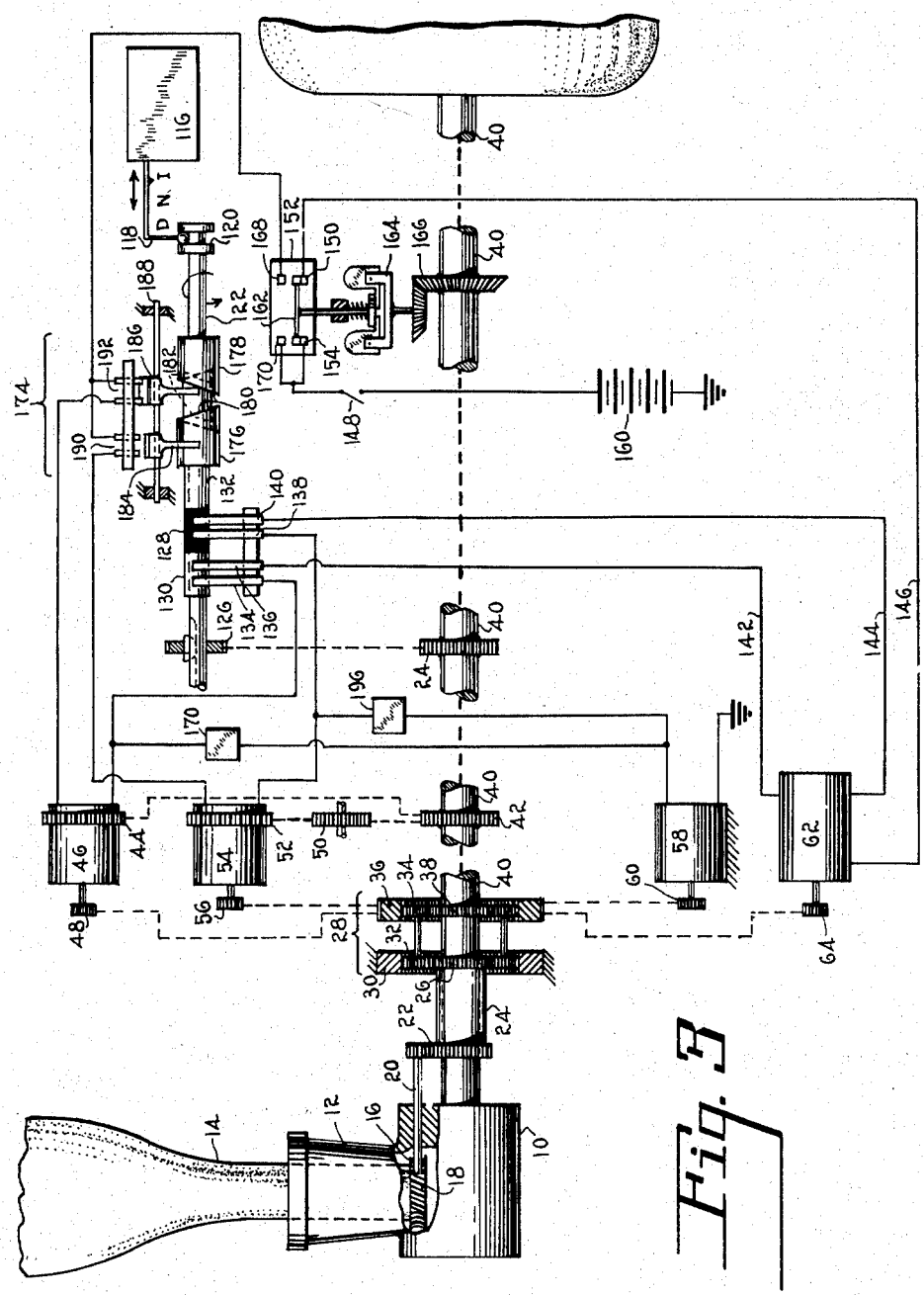
Fig. 3 is a schematic diagram of a propeller system, incorporating the clutch unit of Fig. 1.
Figure 4:
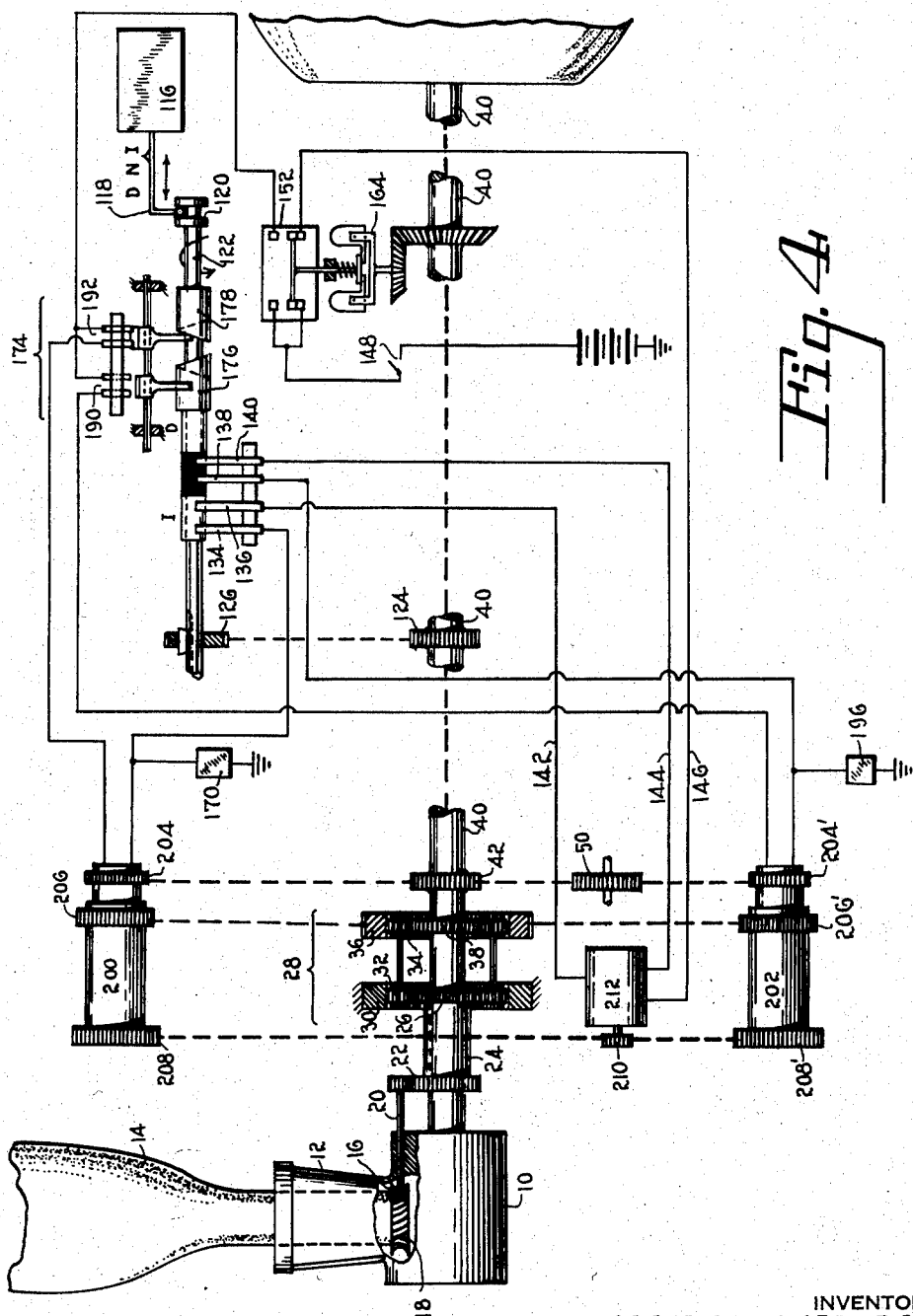
Fig. 4 is a schematic diagram of an alternative arrangement of the invention incorporating the clutch and brake units of Fig. 2.

Reference may be first made to Figs. 1 and 3 with particular emphasis on Fig. 3. Therein, a propeller hub 10 incorporates a plurality of blade sockets, one of which is shown at 12, a blade 14 being suitably mounted in each socket. At its inner end the blade is provided with a worm wheel 16 engaged by a worm 18 driven by a shaft 20 engaging a gear 22 concentric with the hub and carried on a sleeve 24 rotatable with or with respect to the hub. The inboard end of the sleeve carries a gear 26 forming part of a transfer gearing including a fixed internal gear 30 coplanar with the gear 26. Planet pinions 32 are engaged between the gears 26 and 30, these planet pinions being respectively coaxial and rotatable with planet pinions 34.

The latter pinions are embraced by an internal control gear 36, the pinions engaging a sun gear 38 keyed to or driven by the propeller shaft 40. This transfer gearing 28 is somewhat similar to others which have appeared in the prior art and operates as follows: If the control gear 36 is fixed, the sun gear 38 will drive the planet pinions 32, 34 at some speed less than propeller speed and the sun gear 26 will be enforced to rotate at propeller speed because the internal gear 30 is anchored. Thus, the sleeve 24 will rotate with the propeller and no pitch change will be imparted to the propeller blades. If the control gear 36 is rotated in either direction, the sun gear 26 will necessarily be rotated in one direction or the other with respect to the propeller shaft and pitch change will be imparted to the propeller blade. To effect rotation of the blade pitch control gear 36, a gear 42 is provided on the propeller shaft 40 which is meshed with a gear 44 of a clutch unit 46. The clutch is adapted to be engaged by means to be described to enforce increased pitch operation of the propeller. The clutch when engaged drives a pinion 48 meshed with external teeth on the pitch control gear 36 to increase propeller pitch. The propeller shaft gear 42 also drives an idler 50 which in turn drives the gear 52 on a decrease pitch clutch 54, the latter having an output pinion 56 engaged with the external teeth on the pitch control gear 36. When the clutch 54 is engaged, decrease pitch movement is enforced on the gear 36. When both clutches 46 and 54 are disengaged, no pitch change is enforced and during this period, the gear 36 must be braked so that pitch changes will not occur from aerodynamic effects on the propeller blades or other causes. To this end, an electrically actuated brake 58 is provided, including a gear 60 engaged with the pitch control gear 36.

This brake, which need not be described in detail, includes a solenoid actuated disc brake assembly, one of the disc sets carrying the pinion 60 and the other set being anchored against rotation. The brake is normally spring pressed into braking engagement and the solenoid when energized, overcomes the springs and releases the brake. Operation of the clutches and brake on a coincidental basis is provided by the control mechanism to be described.

When propeller rotational speed is low, or where the propeller is not rotating, pitch change is not effected through the clutches and the gearing above described. A small relatively low-powered reversible electric motor 62 is provided, having an output gear 64 meshing with the pitch control gear 36. This motor is utilized principally for the final stages of feathering and the initial stages of unfeathering and for changing propeller pitch when the propeller is not being rotated.

Some of the important features of the invention reside in the clutch units 46 and 54, shown in detail in Fig. 1, and these units will now be described. The units 46 and 54 are substantially identical so that reference characters used for the unit 46 are also applicable to the clutch unit at 54. The unit consists of a fixed pilot shaft 68 secured to a housing 70 through the medium of an electromagnetic unit 72, this number also being utilized to designate the iron core of the unit. A plurality of alternate overlapping pole pieces 74 are arranged around the core 72 and likewise embrace a winding 76 which may be electrically energized. When the winding is energized, high density magnetic flux is built up in the elements 72 and 74 establishing a plurality of peripheral north and south poles. Embracing the elements 72 and 74 is a free-running cylinder 78 having clearance relation to the periphery of the pole pieces 74. When the coil 76 is de-energized, eddy currents are set up in the cylinder 78 creating a torque between the pole pieces 74 and the cylinder 78 tending to stop rotation of the cylinder. The amount of torque attainable depends upon the size of the elements, their relative speed, and the flux density established by the electrical energization and these characteristics are so chosen that the retarding torque imposed on the cylinder 78 is sufficient to energize a servo mechanism now to be described.

The cylinder 78 is carried on a diaphragm 80 antifrictionally borne as at 82 on a sleeve 84. The sleeve 84, relatively rotatable to the cylinder 78 is provided with spokes 86 and a rim 88 on which the gear 44 is formed. This rim incorporates internal splines 90 to which are fitted clutch plates 92. To the diaphragm 80 is secured a member 94 through projections which pass between the spokes 86. On the leftward surface of the member 94, as shown, is formed a waved substantially annular cam track 95. Opposite this track is a similar track 96 on a member 98 whose periphery engages the splines 90 of the rim 88. Balls 100 are disposed between the members 98 and 94, bearing on the cam tracks, and are retained by a perforated retaining ring 102 which is position-controlled by a differential unit 104 comprising pinions on the retainer engaging face gears on the elements 94 and 98 to afford proper position control of the balls 100 between the cam tracks. The balls are so located, referring briefly to Fig. 6, that they will normally be located in the bottoms of the recesses of both cam tracks, to allow axial positioning of the member 96 to the right, as shown in Fig. 1, when the clutch is not energized.

This relieves engaging pressure between the clutch plates 92 and 106, the latter being splined at 108 to the driving member 110 carrying the clutch output gear 48. When the coil 76 is energized, a dragging or retarding force is imposed on the sleeve 78 enforcing an angular displacement between the members 94 and 98 as shown in Fig. 7. Thereupon, the balls 100 roll along the cam tracks 95 and 96 to enforce leftward movement of the member 98, pressing the clutch plates 92 and 106 toward one another to enforce clutch engagement and to lock the input gear 44 and output gear 48 for unitary rotation with one another.

Upon relaxation of energization of the coil 76, the sleeve 78 is free to rotate with the clutch input gear 44. To afford clutch disengagement, a plurality of annular waved springs 112 are disposed between the clutch plates 92. These springs urge these plates apart and are of sufficient power to rotate the members 94 and 98 with respect to each other, when the coil 76 is de-energized, to bring the balls 100 and the cam tracks of the members 94 and 98 into the position of Fig. 6, disengaging the clutch plates 92 and 106.

The force imposed by the springs 112 is carefully selected to overcome the friction in the system involving the elements 94, 96, 100, 104, 82 and 78 to disengage the clutch, but is small enough to be overcome when the eddy current clutch is energized.

The configuration and design of the eddy current clutch unit shown in Fig. 1 is susceptible of considerable modification.

As shown and as utilized in the propeller system of Fig. 3, both the driving and driven members of the clutch unit are normally rotated. If the environment calls for different arrangements, the system can be organized as a brake wherein one member is fixed and the other rotates, and various devices may clearly be made from the design shown. It is pointed out, however, that under normal operating conditions, the eddy current sleeve 78 and the pole pieces 74 should normally rotate with respect to one another so that a control torque may be developed therebetween on energization of the coil 76. The eddy current device inherently allows slip between the relatively rotating members even when energized and does not in itself provide a positive clutching between the members. It is this characteristic which makes the eddy current clutch controller particularly desirable in the environment herein described, for small amounts of electrical power may be utilized to maintain control effect upon a high capacity clutch, the clutch itself being capable of positive unitary lock-up of a driving member relative to a driven member. If the eddy current device were to be used by itself to afford clutching between the driving and the driven member and to develop sufficient torque to afford the necessary pitch control, the eddy current device would have to be unduly magnified in weight and size to the point where it could not be utilized satisfactorily in an aircraft propeller. Doubtless, it is true that there are many other environments besides aircraft propellers wherein size and weight limitations of eddy current clutches would be prohibitive unless they are used as energizing means for powerful positive clutches.

Figure 2:
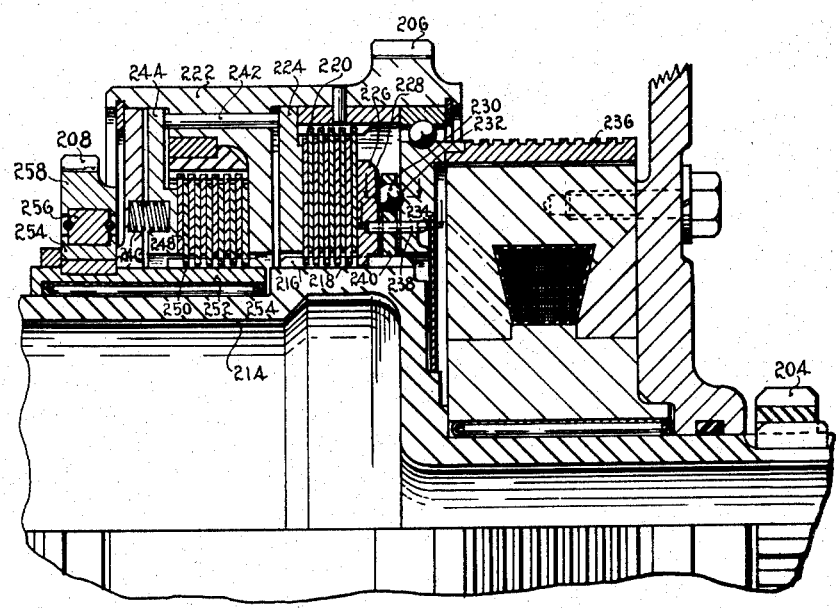
Fig. 2 is a longitudinal section through an alternative form of eddy current operated clutch unit which incorporates a coincidentally operable brake.

Reference may now be made to Figs. 2 and 4–8 in which an alternative embodiment of the invention is disclosed. The principal difference between this embodiment and the one previously described is in the substitution of two clutch-brake units 200 and 202 (Fig. 4) for the clutch units 46 and 54 and the brake unit 58 of Fig. 3. The construction of the combined clutch-brake units 200 and 202, which are similar to one another, is shown in Fig. 2. The unit 200; namely, the increase pitch clutch-brake unit, is selected for detailed illustration and some of the components thereof are found in the schematic arrangement of Fig. 4. The unit includes an input gear 204 driven by the propeller shaft gear 42 and further includes an output gear 206 engaged with the pitch change control gear 36. The unit further includes a gear 208 engaged with the drive pinion 210 of an auxiliary electric motor 212 having increase and decrease pitch field windings and having a coincidentally operable electro-magnetic brake therein which engages to lock the drive pinion 210 against rotation when the motor is not energized. Motors of this type are well known in the art and need no further description. When the motor 212 is not energized, its drive pinion 210 forms a reaction gear, locking the gears 208 and 208′ of the clutch-brake units 200 and 202 against rotation.

Returning to Fig. 2, the drive pinion 204 is mounted upon a sleeve 214 provided with splines 216 carrying clutch plates 218, these plates being interleaved with clutch plates 220 splined at their peripheries within a shell 222 carrying the output gear 206. The shell 222 is journalled for rotation concentrically with the shaft 214. The clutch, including the plates 218 and 220, includes an axially movable reaction plate 224 and an axially movable pressure plate 226. The latter plate includes an annular waved cam track 228 engaged by balls 230 which also are engaged by an annular waved cam track 232 formed in a diaphragm 234, said diaphragm carrying an eddy current shell 236. The shell 236 is normally rotated with the drive shaft 214 and is yieldingly held in certain angular relation thereto by a centering spring 238 also shown in Fig. 8, said spring having turned-over ends engaged in slots formed in the member 234, in the member 226, and in a retainer 240 provided for the balls 230. If a drag force is exerted on the shell 236 tending to retard its rotation behind that of the clutch pressure plate, the spring 238 tends to restore it to centered position but if the drag force is sufficient, the diaphragm will be displaced angularly relative to the pressure plate whereby the balls 230 will force the pressure plate leftwardly as shown to exert clutch engaging pressure thereby connecting the drive shaft 214 to the output pinion 206.

As noted previously, the reaction plate 224 of the clutch is axially movable so that when the clutch is engaged the reaction plate 224 is pressed leftwardly as shown, enforcing leftward movement of pins 242 spaced around and slidable freely in the shell 222. The leftward ends of the pins 242 engage a brake pressure plate 244 which is normally pressed rightwardly by springs 246.

The brake pressure plate 244 engages brake plates 248 and 250 respectively splined to a portion of the shell 222 and to a sleeve 252 piloted on the drive shaft 214 through bearings 254. It will be seen that the brake comprising the plates 248 and 250 is normally engaged by means of the springs 246 and is only released when the pressure plate 244 is pressed leftwardly as a result of engagement of the clutch plates 220 and 218.

The sleeve 252 normally provides an anchor or reaction member for the brake so that when the brake is engaged, the gear 206 is locked against rotation, preventing any pitch change in the propeller blades. However, there are certain conditions of operation of the propeller when the sleeve 252 is rotatable. To the sleeve 252 is secured the inner race 254 of a one-way roller clutch comprising rollers 256 and an outer cammed race 258, this cammed race 258 carrying exterior gear teeth 208 engaged with the drive pinion 210 of the auxiliary electric motor 212. The direction of action of the one-way clutch is such as to permit of free rotation of the entire unit shown in Fig. 2 in one direction, even when the brake 248, 250 is locked up.

The decrease pitch clutch-brake units 202 and 200 are exactly the same, as heretofore noted, except that the one-way clutch forming a part of the left-hand end gear 208' of the unit 202 is of opposite hand from the one-way clutch in the gear 208' of the clutch-brake unit 200. When the increase pitch clutch 200 is engaged for increase pitch, clutch unit 202 will be driven in opposite direction from the propeller shaft power gear 42 through the idler 50 and, though the brake thereof is locked up, the entire decrease pitch clutch-brake unit may turn freely through the action of the roller clutch 258'. Conversely, if the decrease pitch clutch-brake unit is energized to effect pitch decrease of the propeller, the unit 200 will spin in its entirety, the one-way clutch 258 overrunning while the gear 208' is locked from rotation. When neither clutch is energized, both brakes in the units 200 and 202 are locked and no rotation of either can occur since the one-way clutches 258 and 258' oppose one another to prevent rotation.

If, according to the control system previously described, the auxiliary motor 212 is in operation to change pitch, it will turn one of the units 200 or 202 through the one-way clutch thereof and drive the output gears 206 or 206' through the locked brake of the unit; during this precedure, the unit 202 or 200 respectively will not be effective as a driver since its clutch 258' or 258 respectively will over-run.

By suitable design of the clutch units incorporated in the invention, extremely fast action thereof with little slippage during engagement and disengagement may be attained, so that heat rejection from the clutches will be minmized. It should be clear that the clutches are not intended to operate on a slipping basis when pitch change is required—rather, they are energized and de-energized to engage and disengage with great speed, affording positive drive when they are engaged.

While Figs. 1 and 2 disclose servo clutches actuated by eddy current devices, the invention is intended to comprehend servo clutches which may be operated by other electrically energized drag producing mechanisms such as secondary frictional clutches of low capacity.

Though several embodiments illustrating the invention have been illustrated and described, it is to be understood that the invention may be applied in various forms. Changes may be made in the arrangements shown without departing from the spirit or scope of the invention as will be apparent to those skilled in the art and reference should be made to the appended claim for a definition of the limits of the invention.

We claim:

In a servo-operated mechanical coupling comprising relatively rotatable members having axially movable friction elements drivably engageable with one another, a cam on one member, a second cam facing the first constrained against axial movement and relative to which said first cam is axially and rotationally movable, said cams each having deep face portions disposable opposite one another, rollers between and engageable with both cams and disposable at times in said deep portions, means to drag the second cam rotationally behind the first cam to enforce relative rotation of said cams, a retainer engaging said rollers disposed between said cams, both cams and said retainer having substantially similar openings therein, and substantially annular resilient means having parts engaging the borders of all said openings at times and some of said borders at other times for urging alignment of said retainer with said cams to dispose said rollers in said deep cam portions when the dragging means is inoperative.

References Cited in the file of this patent

UNITED STATES PATENTS

| | | |
|---|---|---|
| 2,061,787 | Warner | Nov. 24, 1936 |
| 2,555,215 | Warner | May 29, 1951 |
| 2,623,619 | Clerk | Dec. 30, 1952 |
| 2,649,941 | Doebeli | Aug. 25, 1953 |